United States Patent
Hunt

[19]
[11] Patent Number: 5,853,164
[45] Date of Patent: Dec. 29, 1998

[54] TRACK SUPPORTED WINCH AND METHOD OF MAKING THE SAME

[75] Inventor: George T. Hunt, Deatsville, Ala.

[73] Assignee: Kinedyne Corporation, North Branch, N.J.

[21] Appl. No.: 967,932

[22] Filed: Nov. 12, 1997

Related U.S. Application Data

[63] Continuation of Ser. No. 618,252, Mar. 18, 1996, abandoned.

[51] Int. Cl.$^6$ ....................................................... B21F 9/00
[52] U.S. Cl. ..................... 254/213; 254/266; 242/598.5; 410/103
[58] Field of Search .................................... 254/213, 217, 254/218, 219, 266; 242/598.5; 410/100, 103, 104

[56] References Cited

U.S. PATENT DOCUMENTS

| | | | |
|---|---|---|---|
| 2,895,714 | 7/1959 | Clark | 410/103 |
| 2,991,975 | 7/1961 | Alexander | 254/219 X |
| 4,045,002 | 8/1977 | Miller | 410/103 |
| 5,156,506 | 10/1992 | Bailey | 410/103 X |
| 5,186,586 | 2/1993 | Stephenson, Jr. | 254/217 X |
| 5,261,619 | 11/1993 | Merriweather, Jr. | 242/598.5 X |
| 5,433,565 | 7/1995 | Chan | 410/103 |
| 5,490,749 | 2/1996 | Arbues | 254/218 X |

FOREIGN PATENT DOCUMENTS

| | | | |
|---|---|---|---|
| 2462619 | 3/1981 | France | 410/100 |

OTHER PUBLICATIONS

Winches, Ancra International, p. 7, Aug. 1990.

*Primary Examiner*—Donald P. Walsh
*Assistant Examiner*—Emmanuel M. Marcelo
*Attorney, Agent, or Firm*—Young & Basile, P.C.

[57] ABSTRACT

A winch for mounting upon a track having hooks and flanges wherein the winch includes a base having lips homogeneously formed of the base material which engage the track flanges. The winch construction, and the method for making the winch, permits a high strength construction to be economically formed by punching and bending operations.

2 Claims, 1 Drawing Sheet

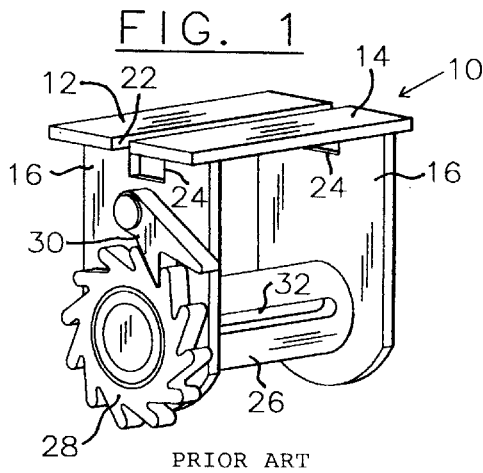
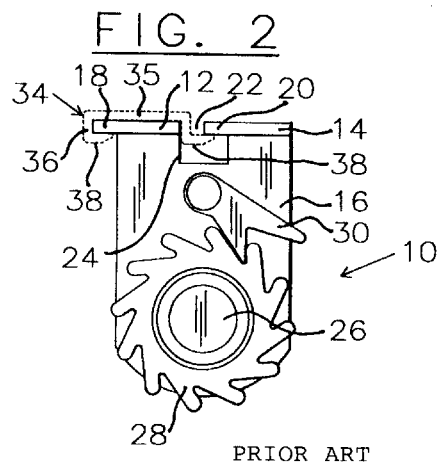
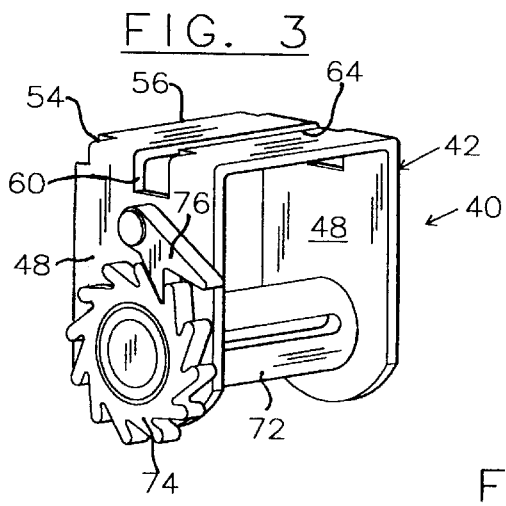
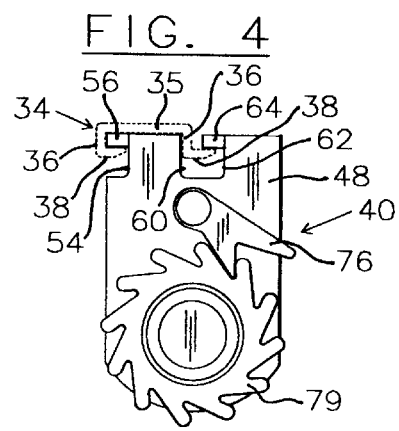
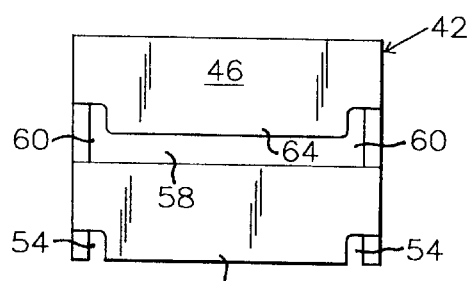
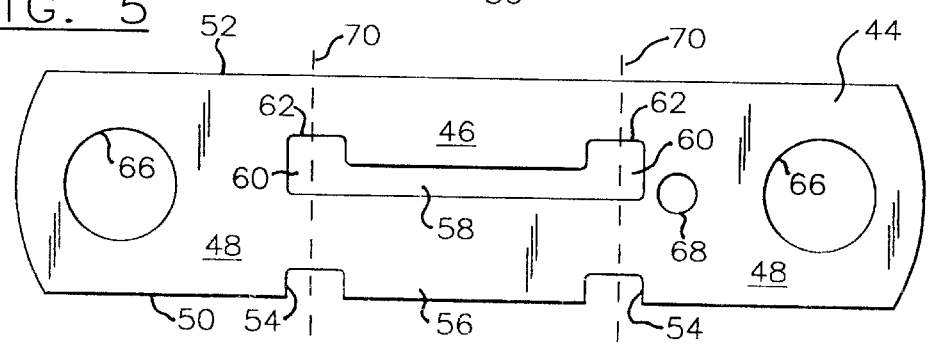

TRACK SUPPORTED WINCH AND METHOD OF MAKING THE SAME

This application is a continuation of application Ser. No. 08/618,252 filed on Mar. 18, 1996 now abandoned.

BACKGROUND OF THE INVENTION

1. Field of the Invention

The invention pertains to winches of the type slidably supported upon tracks, and the method for forming the same.

2. Description of the Related Art

Winches used to tighten cargo retaining straps are often mounted upon elongated tracks fixed to a vehicle bed, floor, or vehicle wall. For ease of proper positioning of the winch, the winches are often slidably associated with their track wherein the winch may be moved along the length of the track to its most desirable position. As the tension forces within the load strap are substantially perpendicular to the length of the track, tensioning of the strap will frictionally lock the winch to the track, and with many winches of this type, separate track locking structure is not required.

A low cost load retaining winch used with LL track having hooks and flanges usually consists of a base member having spaced parallel legs or sides extending therefrom. With winches of the aforedescribed type, it has been the practice to form the winch base by a pair of rectangular plates welded to the legs or sides. The plates are of such configuration as to define lips for engaging the track hook flanges, and openings are defined in the winch sides to provide clearance for the track flanges.

This prior art construction requires that the winch base and side walls are formed of four separate components, and the side walls are welded to the base plates, and such secondary operations as welding are expensive, require time consuming jigging of the components prior to welding, and are susceptible to strength variations in the event proper welding has not occurred.

Objects of the Invention

It is an object of the invention to provide a method for forming a winch wherein track engaging lips for mounting the winch upon a track are homogeneously formed upon the winch base eliminating the need for secondary operations.

Another object of the invention is to provide a winch for use with load retaining straps wherein the winch includes a base having leg portions extending therefrom and the track mounting structure is homogeneously defined on the winch base.

An additional object of the invention is to provide a winch for load restraining straps slidably mountable upon an elongated track wherein the winch includes a base having homogeneously defined leg portions extending therefrom in which a windlass is rotatably mounted, track supporting structure being homogeneously defined in the winch base and openings providing track clearance are defined in the winch walls, all of the base and wall components being formed on a plate blank, the winch base and leg portions being formed upon bending the punched plate blank.

Summary of the Invention

Winches mounted upon vehicles for load retaining purposes wherein the winches are employed to tension load engaging straps are usually relatively small, and are of economical construction. Such winches are usually connectable to, or mounted upon, elongated tracks bolted or welded to the vehicle structure whereby the winch may be positioned along the length of the track merely by sliding the winch thereon. Tensioning of the winch strap imposes a force on the winch perpendicular to the track length producing a high frictional engagement between the winch and track.

A popular vehicle mounted track for use with load bearing winches is of the LL cross-sectional configuration wherein the track includes spaced parallel hooks extending in a common direction from the track base, and each of the hooks includes an elongated flange in spaced relationship to the track base. Lips defined upon the winch base are received upon the flanges between the flanges and the track base and openings are defined in the winch base and walls to provide access for the track flanges. In this manner, the winch, when its load engaging straps are not tensioned, may be readily moved along the longitudinal length of the track, but upon tightening of the load straps, the strap tension forces frictionally lock the winch to the track.

Previously, the track flange engaging lips defined on the winch base were formed by separate plates welded to the winch wall portions wherein such plates constitute the winch base itself. Such a construction requires extensive fabrication as the base plates must be welded to the leg portions in an accurate manner.

In the practice of the invention, a steel plate or blank is placed in a punch press and notches, a slot having enlarged ends at the slot ends, and windlass receiving holes are defined in the blank. Upon bending the leg portions of the blank at a 90° orientation to the central base portion of the blank, a lateral edge of the blank, and an edge of the slot, define lips capable of being received on the track hook flanges, and enlarged openings formed adjacent the slot ends also extend into the leg portions providing openings for clearance of the track.

Because the winch mounting structure is homogeneously defined from the winch plate blank, the only secondary operation required is the bending of the blank leg portions, and no welding procedures are required, as was necessary with the previously described version of the invention.

The elimination of welds assures uniform strength and the practice of the invention substantially reduces the cost of manufacturing this type of load retaining winch.

BRIEF DESCRIPTION OF THE DRAWINGS

The aforementioned objects and advantages of the invention will be appreciated from the following description and accompanying drawings wherein:

FIG. 1 is a perspective view of a prior art winch having base plates welded to side or leg portions, FIG. 2 is a side elevational end view of the prior art winch of FIG. 1 as taken from the left thereof, FIG. 3 is a perspective view of a winch in accord with the invention, FIG. 4 is an end elevational view of the winch of FIG. 3, FIG. 5 is a plan view of the steel blank, after punching, flame cutting, etc., from which the winch frame in accord with the invention is formed, and FIG. 6 is a plan view of the base of a winch frame constructed in accord with the invention concepts.

DESCRIPTION OF THE PREFERRED EMBODIMENT

A prior art winch over which the invention is an improvement mountable upon LL track is shown in FIGS. 1 and 2, the winch being generally indicated by reference 10. The winch 10 includes a rectangular base plate 12 and a similar rectangular base plate 14. The plates 12 and 14 are welded to legs or side walls 16 formed of plate material, the plane of the base plates being perpendicular to the plane of the spaced parallel legs 16.

As best appreciated from FIG. 2, the base plate 12 is of such width as to define a lip 18 extending beyond the edge of the legs 16, and a similar lip 20 is defined by base plate 14. A space or clearance 22 exists between the plates 12 and 14 in alignment with openings 24 defined in the legs 16 as will be appreciated from the drawing.

A windlass shaft 26 is rotatably mounted within holes defined in the legs 16, and the end of the windlass shaft not visible in the drawing includes a hexagonal head, or other torque transfer structure permitting the windlass to be rotated, as is well known in the art. The other end of the windlass 26 includes the ratchet 28 engaged by the dog 30 pivoted on the associated leg 16 assuring unidirectional rotation of the windlass during strap tensioning. The dog 30 may be removed from the teeth of the ratchet 28 when it is desired to rotate the windlass in a non-strap tensioning direction. The windlass is formed with a diametrical slot 32 in which the load retaining strap, not shown, extends which is wound upon the windlass as it rotates.

The winch 10 is mounted upon a LL track 34, shown in dotted lines in FIG. 2, and the track 34 includes a base 35 which is attached to the vehicle bed or wall by screws, bolts, rivets or welding, not shown, and hooks 36 extend from the track base terminating in flanges 38 which are in a spaced parallel relationship to the plane of the track base 35.

The winch 10 may be mounted upon the track 34 by aligning the lips 18 and 20 with the track flanges when the winch is located at the end of the track 34 wherein movement of the winch 10 in a longitudinal direction parallel and in alignment with the track permits the lips 18 and 20 to rest upon the track flanges 38 as shown in FIG. 2. This mounting of the winch on the track is possible because the openings 24 formed in the legs 16 accommodate the right hook and flange as represented in FIG. 2.

The winch 10 is longitudinally moved along the track 34 as desired, and the load strap is then passed around the load, not shown, and through the windlass slot 32. Rotation of the windlass winds the strap thereon tensioning the strap to restrain the load. Rotation of the windlass in the opposite strap release direction is prevented by the ratchet 28 and dog 30. As the load strap is tensioned, the force within the load strap is perpendicular to the length of the track 34 and produces a frictional engagement between the winch and track which prevents relative movement therebetween and the winch effectively tensions the load retaining strap as desired. To release the strap tension, the windlass 26 is slightly rotated in a strap tensioning direction, the dog 30 is pivoted away from the teeth of the ratchet 28, and the windlass may then be rotated in a strap tension releasing direction as is well known.

Winches constructed in accord in the aforedescribed manner properly function, but are expensive to manufacture in that the plates 12 and 14 must be welded to the legs 16, and it is the purpose of the invention to eliminate this secondary welding operation.

With reference to FIGS. 3–5, the winch 40 utilizing the concepts of the invention has the same general overall appearance as the winch 10. The winch 40 includes a U-shaped frame 42 which is formed from a flat plate blank 44 of metal, as described below.

The blank 44 includes a central region 46 and end or leg regions 48, and the blank 44 includes an elongated lateral side or edge 50 parallel to the opposite lateral side or edge 52.

The plate blank 44 may be formed by a punching operation in a punch press, flame cutting, or other known techniques, and the operation includes the formation of the spaced notches 54 intersecting the lateral edge 50 so as to define a lip 56 therebetween.

Also, a longitudinally extending slot 58 is punched in the blank 44 centrally intermediate the sides 50 and 52 and openings 60 are defined at the ends of the slot 58 which include the recesses 62 which define a lip 64. From FIG. 5, it will be appreciated that each notch 54 is aligned with an opening 60 in a direction perpendicular to the length of the blank 44.

Windlass receiving holes 66 are defined in the blank leg regions 48 as is the hole 68 for receiving the dog pivot.

Upon forming the blank 44 as described above having the configuration shown in FIG. 5, the blank leg portions 48 are then bent along bend lines 70 passing through the aligned notches 54 and slot openings and recesses 60 and 62. The leg regions 48 are bent so as to be 90° with respect to the central region 46 which now constitutes the base region of the formed winch 40 as shown in FIGS. 3 and 4.

Upon completion of the bending of the leg regions or portions 48, the windlass 72 may be rotatably located within the aligned holes 66 and the ratchet 74 affixed to the windlass while the dog 76 will engage the teeth of the ratchet as pivoted upon a pivot received within hole 68.

The configuration of the formed winch 40 in accord with the inventive concepts will be readily appreciated from FIGS. 3, 4 and 6. The notches 54 define clearance for the left track hook 36 as shown in FIG. 4, while the slot openings 60 which also extend into the leg regions 48 provide clearance for the right track hook 36 and right flange 38 as in shown in FIG. 4. As will be appreciated from FIG. 4, the winch lips 56 and 64 will engage the flanges of the track 34 for mounting the winch 40 thereon in exactly the same manner as the mounting of the winch 10 upon the track 34.

By bending the blank 44 along the bend lines 70 which intersect the notches 54 and openings 60, clearances are provided in the winch frame legs 48 for the track hooks and flanges, and a winch constructed in accord with the invention eliminates all secondary welding operations as described above with respect to the prior art shown in FIGS. 1 and 2. As the lips 56 and 64 are homogeneously formed of the material of the blank 44, maximum strength characteristics are achieved without the need for secondary operations, and the winch 40 may be manufactured at a cost significantly less than the prior art winch 10 shown in FIGS. 1 and 2.

It is appreciated that various modifications to the inventive concepts may be apparent to those skilled in the art without departing from the spirit and scope of the invention.

I claim:

1. The method of forming a winch adapted to be supported on a track having a longitudinal axis, a base, and a pair of spaced longitudinally extending track hooks depending from the base in common direction each track hook having a flange spaced from the base wherein the winch is slidably mounted on the track hook flanges, the method comprising the steps of:

(a) forming a flat elongated plate blank having a longitudinal axis, first and second spaced lateral sides, end regions and a central region, a pair of spaced notches defined in said blank first lateral side each defined by end edges transverse to said blank longitudinal axis wherein said first lateral side defines a first track hook engaging lip intermediate said notches, an elongated slot defined in said blank central region substantially parallel to said longitudinal axis and spaced between said lateral sides, said slot including a central portion of reduced width and end region openings of greater width than said slot central portion, said end region openings each being defined by end edges transverse to said blank longitudinal axis, said slot openings including recesses extending away from said first lateral side wherein a second lip is defined on said central region by said slot intermediate said slot openings extending toward said first lip, said slot openings being spaced from each other a distance equal to the spacing of said notches wherein pairs of said notches and slot openings and their respective end edges are laterally aligned, (b) bending said blank end regions in a common direction with respect to said central region along bend lines through laterally aligned pairs of notches and openings intermediate the end edges thereof whereby said bent end regions define spaced winch supporting walls and said central region defines a winch base interconnecting said walls, portions of each of said laterally aligned pairs of notches and openings being located on each of said walls and said winch base to provide access to their associated lips in the direction of said blank longitudinal axis wherein said lips are adapted to be received upon the track hook flanges between the flanges and the track base to slidably interconnect said winch base and walls to the track, and (c) mounting a rotatable windlass upon said walls.

2. A winch adapted to be supported upon a track having spaced parallel hooks each having a flange wherein the winch includes a frame having a flat base and spaced walls extending therefrom, the base having first and second lateral sides and said walls being substantially perpendicular to and intersecting the base at corners, and a windlass rotatably mounted upon and extending between the walls, the improvement comprising openings formed in the frame forming lips homogeneously defined on the frame base of the material thereof and adapted to receive the track flanges, and aligned pairs of openings defined in each of the walls at the corners thereof communicating with the lip-defining openings in the frame base whereby the track flanges are adapted to extend through the openings to permit said lips and winch frame to be slidably mounted on the track, said lips comprising first and second spaced parallel lips defined on the frame base, said lips having ends, said openings defined in the wall at the corners being in alignment with said lip ends and the longitudinal length of said lips, said first lip being defined by the first lateral side of the base, a slot defined in the base intermediate the base sides, said slot defining said second lip, notches defined in the base first lateral side and the wall corners adjacent the base first lateral side, said notches defining said openings in alignment with said first lip.

* * * * *

(12) EX PARTE REEXAMINATION CERTIFICATE (7389th)
United States Patent
Hunt

(10) Number: US 5,853,164 C1
(45) Certificate Issued: Mar. 2, 2010

(54) TRACK SUPPORTED WINCH AND METHOD OF MAKING SAME

(75) Inventor: George T. Hunt, Deatsville, AL (US)

(73) Assignee: Kinedyne Corporation, North Branch, NJ (US)

Reexamination Request:
No. 90/010,411, Jun. 5, 2009

Reexamination Certificate for:
Patent No.: 5,853,164
Issued: Dec. 29, 1998
Appl. No.: 08/967,932
Filed: Nov. 12, 1997

Related U.S. Application Data

(63) Continuation of application No. 08/618,252, filed on Mar. 18, 1996, now abandoned.

(51) Int. Cl.
*B21F 09/00* (2006.01)

(52) U.S. Cl. .............. 254/213; 254/266; 242/598.5; 410/103

(58) Field of Classification Search ............ None
See application file for complete search history.

(56) References Cited

U.S. PATENT DOCUMENTS

| | | | | | |
|---|---|---|---|---|---|
| 1,533,724 | A | * | 4/1925 | Clarke-James | 403/361 |
| 3,697,045 | A | * | 10/1972 | Farley | 410/103 |
| 4,109,598 | A | * | 8/1978 | Kucher et al. | 29/897 |
| 4,470,716 | A | * | 9/1984 | Welch | 403/254 |
| 4,972,697 | A | * | 11/1990 | Andrea | 72/379.2 |
| 4,984,752 | A | * | 1/1991 | Marrs et al. | 242/379 |
| 5,265,992 | A | * | 11/1993 | Jensen | 410/116 |

OTHER PUBLICATIONS

Kalpakjian, Serope; "Manufacturing Processes for Enginnering Materials", Addison–wesley Publishing Co., Jul. 1985, pp. 414–421.* http://en.wikipedia.org/wiki/Bolt_action, Wikipedia.*

* cited by examiner

Primary Examiner—Glenn K. Dawson

(57) ABSTRACT

A winch for mounting upon a track having hooks and flanges wherein the winch includes a base having lips homogeneously formed of the base material which engage the track flanges. The winch construction, and the method for making the winch, permits a high strength construction to be economically formed by punching and bending operations.

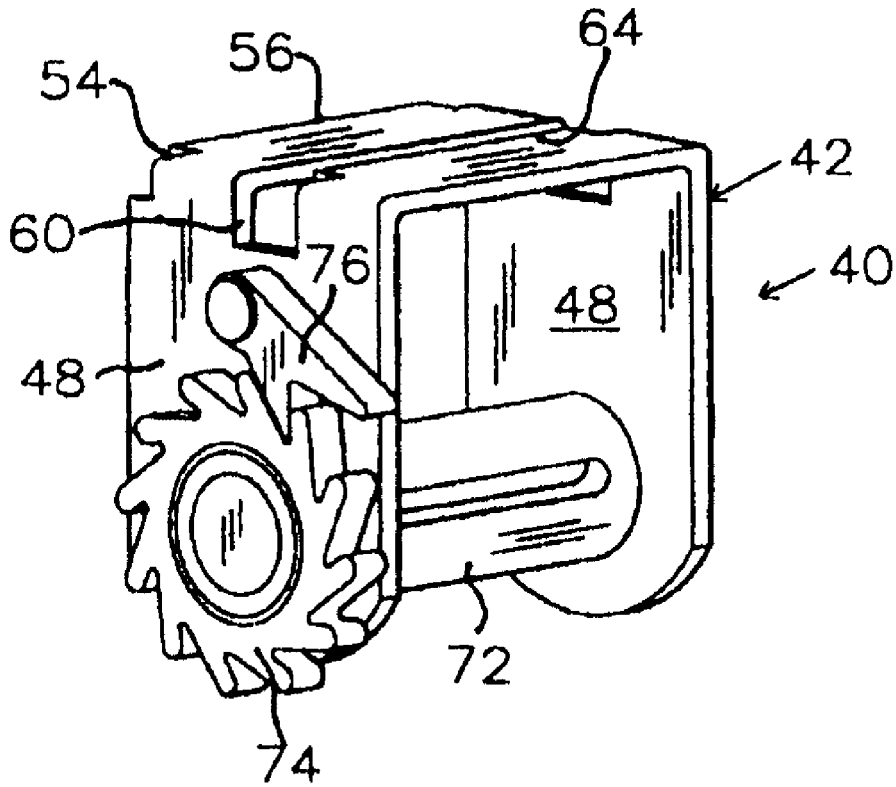

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *